April 14, 1970   C. P. VAN DIJK ET AL   3,506,396
NITRIC ACID PRODUCTION

Filed July 11, 1966   2 Sheets-Sheet 1

INVENTORS
CHRISTIAAN P. VAN DIJK
ROBERT KAISER
BY
John C. Quinlan
Don H. Phillips
ATTORNEYS 3,506,396
NITRIC ACID PRODUCTION
Christiaan P. van Dijk, Westfield, N.J., and Robert Kaiser, Cambridge, Mass., assignors to Pullman Incorporated, Chicago, Ill., a corporation of Delaware
Filed July 11, 1966, Ser. No. 564,345
Int. Cl. C01b 21/44
U.S. Cl. 23—160      5 Claims

ABSTRACT OF THE DISCLOSURE

This invention relates to a process for preparing nitric acid in concentrations of up to about 98% or higher. More particularly, this invention relates to a process as aforesaid wherein a first gas stream containing $NO_2$ is contacted by a first liquid stream containing water and at least about 67 weight percent $H_2SO_4$ to produce a second gas stream containing $HNO_3$ as part of said second gas stream.

Figure 1:
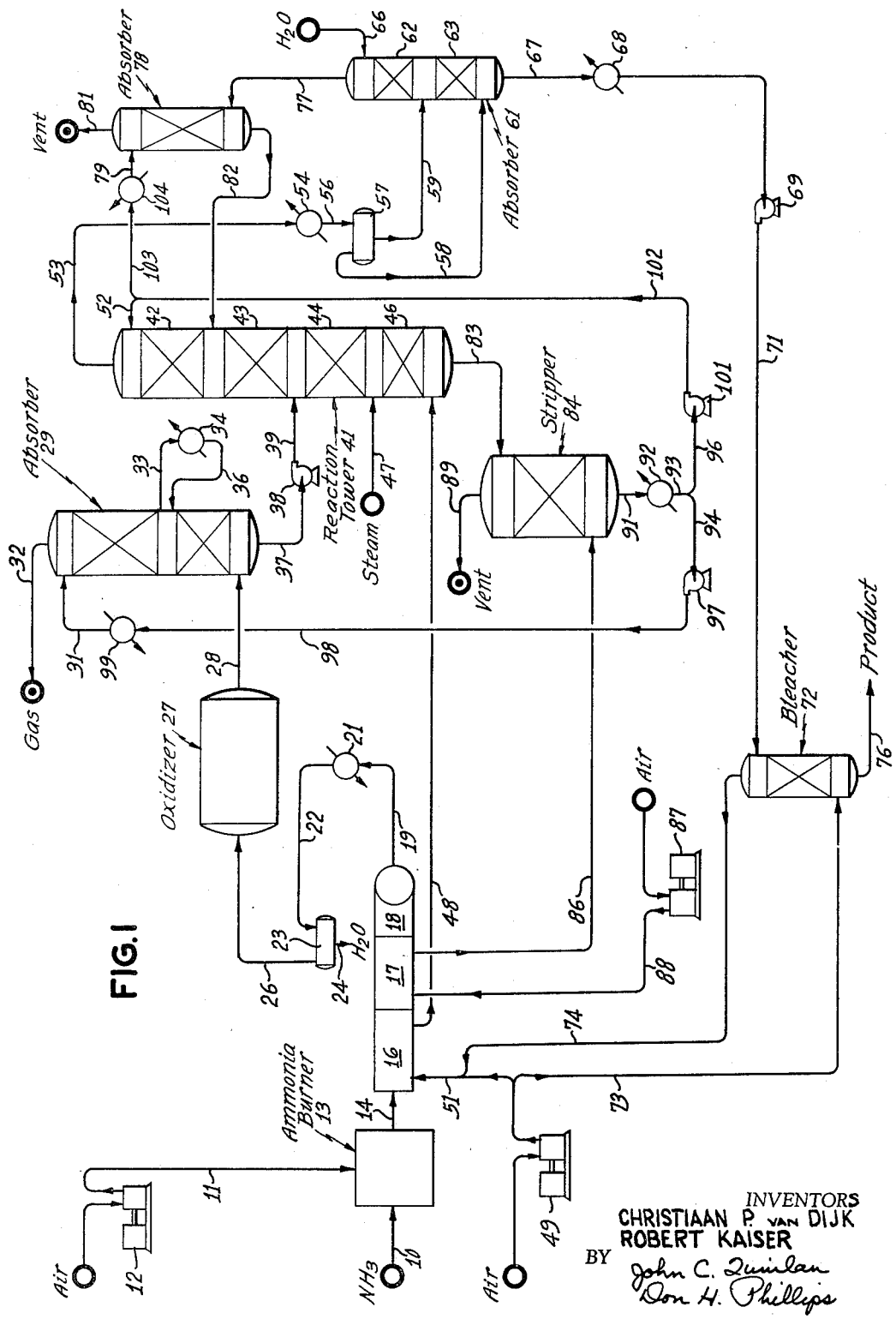

The $HNO_3$ is received from the second gas stream. A third gas stream which contains NO and $NO_2$ is recovered from a second liquid stream containing water and $HNSO_5$. The second liquid stream is also a product of the reaction between $NO_2$ and at least 67% $H_2SO_4$. A third liquid stream containing water and $H_2SO_4$ is recovered from the second liquid stream. At least a portion of the third gas stream is oxidized to produced a fourth gas stream enriched in $NO_2$. At least a part of said fourth gas stream and at least a part of the third liquid stream are each separately recycled to provide at least part of the first gas stream and the first liquid stream respectively.

---

The present invention relates to the production of nitric acid and, more particularly, to an improved process for the production of nitric acid employing sulfuric acid, a process by which nitric acid of standard low strength (less than about 68%) or of high strength (68–98% or higher) can be produced simply and economically.

Nitric acid is produced commercially by reacting ammonia and air in the presence of a platinum-rhodium catalyst to produce a gas containing NO, further oxidizing NO to $NO_2$ using air, and absorbing the $NO_2$ in water according to reaction (1):

$$3NO_2 + H_2O = 2HNO_3 + NO \qquad (1)$$

The NO produced is partially reoxidized with air to $NO_2$ to permit further nitric acid formation by reaction (1). Oxidation of NO to $NO_2$ is a relatively slow reaction favored by lower temperatures and higher pressures. The nitric acid tower is therefore made large to allow sufficient residence time for the NO oxidation reaction. Cooling is generally provided on each tray of the tower, and the total pressure is maintained at about 8 atmospheres. The equilibria of the reactions involved are such, however, that the $HNO_3$ strength is limited in this conventional commercial process to 58–65% $HNO_3$. Since the $HNO_3$-$H_2O$ system forms an azeotrope at about 68% $HNO_3$, it is not possible to distill the acid produced by the conventional process to higher strengths in the range of from 70 to 98%. Acid of these strengths is usually made by dehydrating the dilute nitric acid with sulfuric acid and distilling off strength nitric acid. The combined process is accordingly complex and expensive.

It is the principal object of the invention to provide an improved process for the production of nitric acid.

Another object of the invention is to provide a direct method for the production of high strength nitric acid using sulfuric acid.

Still another object of the invention is to provide a nitric acid recovery process adapted to the recovery of nitrogen oxides generated by the oxidation of ammonia at low pressures, whereby the advantages of low-pressure ammonia oxidation can be realized.

Yet another object of the invention is to provide a nitric acid process capable of reducing losses of nitrogen oxides to very low levels.

Figure 2:
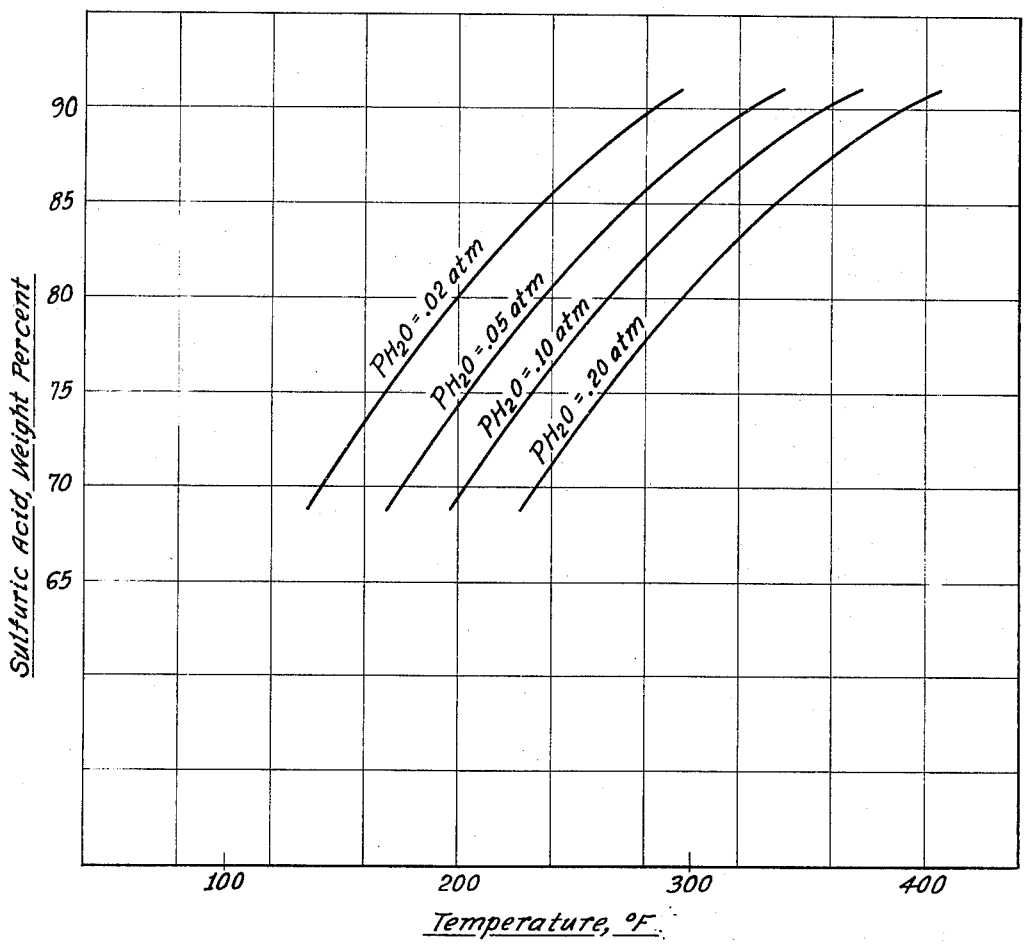

Various other objects and advantages of the invention will be apparent to those skilled in the art from the following detailed discussion and description taken with the accompanying drawings in which:

FIGURE 1 is a process flowsheet illustrating one preferred embodiment of the invention, and FIGURE 2 is a graphical presentation of data correlating temperature and sulfuric acid strength with the partial pressure of water shown as a parameter.

The above and other objects are accomplished in accordance with the invention by the combination of steps comprising:

(a) Contacting a first gas stream containing $NO_2$ with a first liquid stream containing water and at least 67 weight percent $H_2SO_4$ to produce a second gas stream containing $HNO_3$ and a second liquid stream containing water and nitrosylsulfuric acid ($HNSO_5$), (b) Separating the second gas stream from the second liquid stream, (c) Recovering $HNO_3$ as a product of the process from the second gas stream, (d) Recovering a third gas stream containing NO and $NO_2$ and a third liquid stream containing water and $H_2SO_4$ from the second liquid stream.

(e) Oxidizing at least a portion of the third gas stream to produce a fourth gas stream enriched in $NO_2$, and (f) Separately recycling at least a part of the fourth gas stream and at least a part of the third liquid stream to step (a) of the process to provide at least part of the first gas and first liquid streams, respectively.

In the first step or step (a) of the process, $NO_2$ is absorbed in and reacts with $H_2SO_4$ according to reaction (2):

$$2NO_2 + H_2SO_4 = HNSO_5 + HNO_3 \qquad (2)$$

This reaction, thought to proceed in the liquid phase, produces $HNO_3$ which will be distributed between the liquid and gas phases according to the applicable equilibrium at the prevailing conditions. It is preferred that conditions be controlled to optimize the yield of $HNO_3$ in the gas phase, since $HNO_3$ product is recovered in step (c) from this phase following separation step (b). It has been found that relatively high strength sulfuric acid is required to obtain a significant amount of production of $HNO_3$ in the gas phase. The minimum sulfuric acid strength is about 67 weight percent. Although sulfuric acid concentrations as high as 100% can be used, this has the disadvantage that the resulting second liquid stream containing water and $HNSO_5$ is concentrated in $H_2SO_4$, requiring greater dilution and/or heating to regenerate the $HNSO_5$ solution, in turn requiring greater stripping of water and/or cooling in order to regenerate, prior to recycling, the $H_2SO_4$ solution obtained upon regeneration of the $HNSO_5$ solution. With this criterion in mind, it is preferred to employ a first liquid stream containing water and between about 78 and about 89 weight percent $H_2SO_4$. The first liquid stream can also contain amounts of $HNSO_5$ and/or $HNO_3$ in certain applications of the process, but these constituents are not essential nor are they taken into account in expressing the $H_2SO_4$ strength in this specification or in the appended claims.

The particular conditions of temperature, pressure, sulfuric acid strength and liquid and gas rates employed in step (a) of the process can vary widely depending upon desired conversion and the amount and strength of nitric acid to be produced. These conditions are accordingly not critical, although they are interdependent once a particular first gas stream and a desired second gas stream are established. FIGURE 2 of the drawings can be used as a guide in establishing the dependent variables. One assumes a particular partial pressure of water in the second gas stream and thereby establishes the line of interest of FIGURE 2. Starting at the left-hand end of the line by selecting a relatively low temperature, the corresponding strength of the sulfuric acid in the first liquid stream is fixed. For a first gas stream containing a particular partial pressure of $NO_2$ and for particular chosen gas and liquid rates, equilibrium calculations or an experiment will then establish $HNO_3$ make and strength as well as $NO_2$ conversion. If one desires greater conversion, $HNO_3$ make and strength, one proceeds up the line of interest and repeats the calculation or experiment at a higher temperature and the correspondingly $H_2SO_4$ strength, and so on until the desired levels are reached. As indicated, FIGURE 2 serves merely as a guide in establishing relationships amongst the variables. Its use is not esesntial to nor does it form any part of the process of the invention.

In general, while no rigidly fixed operating conditions are essential to produce nitric acid in accordance with reaction (2), certain ranges of operating conditions are preferred. In this connection, temperatures in step (a) are desirably maintained at between about 100° F. and about 400° F. In the case of a continuous process carried out in countercurrent contacting equipment, the temperature referred to applies to the topmost stage where fresh sulfuric acid contacts the gas that has passed up through the lower stages. Temperatures below about 100° F. at this point are undesirable because cooling water of low enough temperature is not available to condense $HNO_3$ from the gas, refrigeration or other expensive measures being required in such case. On the other hand, temperatures above about 400° F. are not desirable because such temperatures bring higher water vapor carryover in the gas, they may lead to some decomposition of $HNO_3$, and they present a more difficult materials selection problem because of the increased corrosiveness of the chemicals involved at such temperatures.

The total pressure at which step (a) is practiced can be any desired value, ranging from subatmospheric pressure to 20 atmospheres or more. The reactions involved are essentially independent of total pressure, and hence, the pressure level can be freely selected consistent with, for example, the pressure level at which the $NO_2$-containing gas is available.

Nitrogen values can be fed to the nitric acid process in several forms, namely, as $NO_2$, as NO, or as an $HNSO_5$ solution. Each form would be fed to the appropriate point in the process. For example, if the feed is an $HNSO_5$ solution, it would be added to the second liquid stream which is to be regenerated. This method is of particular importance in the production of nitric acid by recovery of nitrogen oxides generated by the oxidation of ammonia at low pressures.

The advantages of low pressure ammonia oxidation can thus be realized. These include higher conversion of ammonia to nitrogen oxides (less of the nitrogen content of the ammonia is converted to elemental nitrogen), improved platinum-rhodium catalyst life, reduced requirements for air compression, and improved ability to separate, by condensation, water formed by the oxidation of ammonia, without significant losses of nitrogen oxides. Thus, ammonia can be contacted with excess air in the presence of a catalyst at a pressure of about 1 to about 4 atmospheres (absolute) to produce a gas containing NO, $N_2$, $O_2$ and $H_2O$. This gas can be cooled and partially condensed to permit removal of water. Since at these low pressures little NO will be oxidized to $NO_2$, no significant loss of nitrogen oxides by reaction (1) will occur. The NO and $O_2$ in the dried gas can then be allowed to react in part to $NO_2$ by providing sufficient residence time, whereupon the NO and $NO_2$ can be absorbed in aqueous $H_2SO_4$ to form aqueous $HNSO_5$ which can be pumped inexpensively to whatever pressure is desired and then regenerated to produce the $NO_2$-containing gas for step (a) of the process. This process is to be contrasted with the conventional process operating at about 8 atomspheres wherein relatively lower ammonia conversion efficiency is obtainable, reduced catalyst life is experienced and greater air compression is required. Furthermore, at a pressure of about 8 atmospheres, a substantial amount of NO oxidation to $NO_2$ will necessarily occur in the course of the passage of the gas through the equipment, such that upon cooling to condense some of the water present, the condensate will contain varying amounts of $HNO_3$ up to about 35% due to the absorption and reaction of the $NO_2$ with water according to reaction (1).

The rate at which aqueous $H_2SO_4$ is supplied relative to the rate of $NO_2$-containing gas in step (a) of the process will depend upon the concentration of nitrogen oxides in the gas. It is desired to maintain in solution the $HNSO_5$ formed. Thus, it will not be desirable to employ a sulfuric acid rate so low that a solid precipitate of $HNSO_5$ might be formed, since such a precipitate would tend to build up and block the equipment. Substantially greater sulfuric acid rates can be used, although very high rates would not be desirable because of the added costs of circulating large excesses of sulfuric acid through the system.

The second gas stream, produced in step (a) of the process, will contain $NO_2$ and $H_2O$, in addition to $HNO_3$, together with whatever inert gases, usually $N_2$, that were present in the first gas stream. Trace to small amounts of NO will also be present in the second gas stream. It is advantageous to select conditions for step (a) of the process such that the $HNO_3$ content of the second gas stream is at least 10 mol percent of the total combined nitrogen of the second gas stream, since at or above this level, nitric acid of desirably high strength can be recovered economically, as hereinafter more fully described. The expression "total combined nitrogen" as used in this specification and the appended claims is intended to embrace all of the $HNO_3$, $NO_2$, NO, $N_2O_3$, $N_2O_4$ and $N_2O_5$ which may be present. The relative amounts of the various forms of combined nitrogen in the second gas stream are sensitive to the temperatures employed, those in the range previously stated being suitable, particularly the lower temperatures in that range.

The first gas stream containing $NO_2$ contacted in step (a) of the process can be obtained from any available source including, for example, an extraneous source of $NO_2$, oxidation of NO from an extraneous source such as ammonia burner gas (primary oxidation), oxidation of NO recovered upon regeneration of $HNSO_5$ in the process (secondary oxidation), oxidation of free nitrogen, and the $NO_2$ liberated upon regeneration of $HNSO_5$ in the process. A significant source of $NO_2$ for step (a) of the process, in any case, is the third gas stream recovered in step (d) of the process from the second liquid stream produced in step (a) and separated in step (b). This recovery step involves the regeneration of $HNSO_5$ according to reaction (3):

$$2HNSO_5 + H_2O = NO_2 + NO + 2H_2SO_4 \qquad (3)$$

Reaction (3) can be made to proceed in the direction written by means of dilution with water, by heating, by stripping with a stripping gas, or by any combination thereof. One suitable method for regenerating the aqueous $HNSO_5$ is to contact it with steam, thereby simultaneously subjecting the solution to stripping, heating and dilution, the latter being the result of water condensed from the steam. Still better results are obtainable by contacting the $HNSO_5$ with air, preferably preheated, thereby subjecting the solution to stripping (and to heating, if the air is preheated) and simultaneously providing oxygen for secondary oxidation of the NO liberated by reaction (2) and increasing the production of $NO_2$. Combining the use of steam and air has the advantage over the use of either alone in that relatively less acid dilution and attendant reconcentration is involved and relatively lower amounts of inert nitrogen are introduced.

The third gas stream recovered in step (d) of the process will be equimolar in NO and $NO_2$ as indicated by the stoichiometry of reaction (3). The third gas stream is oxidized in step (e) to produce the fourth gas stream enriched in $NO_2$. Such oxidation is essential prior to recycling the gas to step (a) in order to obtain production of $HNO_3$ by reaction (2) and avoid simply reabsorbing the equimolar $NO-NO_2$ mixture ($N_2O_3$) to form $HNSO_5$ in step (a). Such oxidation can be carried out simultaneously with step (d) by using stripping air as indicated above, or independently of step (d) by providing a separate oxidizing agent. Preferably stripping air is used.

The third liquid stream containing water and $H_2SO_4$, obtained in step (d) of the process by means of making reaction (3) proceed to the right, can be obtained with the $H_2SO_4$ concentration being that used in step (a), in which case it can be recycled in accordance with step (f) directly to step (a). More usually, however, the third liquid stream will be more dilute than the first liquid stream owing to the addition of water in the course of regenerating the $HNSO_5$ solution of step (a). In this event, and in accordance with a preferred embodiment of the invention, the third liquid stream is concentrated prior to recycling same to step (a) of the process. This can be done by heating, by contact with a stripping gas, by flashing or by a combination thereof, for example, by contacting the third liquid stream with hot air, whereby the combined effect of the heat and the stripping action of the air will vaporize and drive off the quantities of water present in the third liquid stream to restore its acid strength to the level of the first liquid stream or to such other level at which it is recycled to step (a). The recycled acid stream can contain some $HNSO_5$ and $HNO_3$, as previouly indicated, in which event the nitrogen values thereof can be recovered in the process.

Nitric acid is recovered as a product of the process from the second gas stream in step (c) of the process. This can be achieved by cooling and partially condensing $HNO_3$ as a condensate, the strength of which will depend upon the relative proportions of $HNO_3$ and $H_2O$ which are present in the second gas stream and the temperature to which the second gas stream is cooled. It is possible to condense very little water and thus produce almost 100% $HNO_3$, but more usually some water will condense, depending upon the amount of water present, and the condensate will contain 90% $HNO_3$ and higher. $HNO_3$ can also be recovered from the second gas stream by absorption into water or dilute nitric acid, or by a combination of cooling and absorption whereby high strength nitric acid of 70-98% strength, or substantially lower strength, if desired, is recovered.

The second gas stream from which $HNO_3$ is recovered will frequently contain a substantial proportion of $NO_2$. Its presence can influence selection of the $HNO_3$ recovery method used and related processing in two important ways. Firstly, in the course of cooling the second gas stream to condense $HNO_3$, the lower temperatures involved tend to cause dimerization of the $NO_2$ to $N_2O_4$, a highly exothermic reaction. Therefore, to the extent that $NO_2$ is present, the cooling required to condense $HNO_3$ will be substantially augmented by the cooling required to remove the heat of reaction of $NO_2$ to $N_2O_4$. Where cooling is used, wholly or in part, to recover $HNO_3$ from the second gas stream, it is desirable that the relative proportion of $HNO_3$ to $NO_2$ be high. In general, it is preferred, in view of the cooling considerations mentioned, that the $HNO_3$ content of the second gas stream be at least 10 mol percent of the total combined nitrogen in that stream.

The second way in which the presence of $NO_2$ in the second gas stream influences selection of the $HNO_3$ recovery method used concerns the recovery of $NO_2$ to prevent its being lost from the process. Where $HNO_3$ is recovered, wholly or in part, by absorption into water or dilute nitric acid, some of the $NO_2$ present and of the $N_2O_4$ formed therefrom in the second gas stream, will be recovered as nitric acid as a result of reaction with water in accordance with reaction (1). The amount of $NO_2$ and $N_2O_4$ recovered in this way will depend upon the relative amount of water or dilute acid used. If small relative amounts of water are used, production of $HNO_3$ by reaction (1) will be relatively small. At the same time, the $HNO_3$ product strength will be greater. In any event, some of the $NO_2$ and of any $N_2O_4$ formed therefrom will not be recovered by reaction with water. It is preferred to recover and recycle these nitrogen values as well as the nitrogen value of the NO produced by reaction (1). Such recovery and recycle can be accomplished in any suitable way, but it is preferred to contact the gas stream (remaining after washing with water or dilute nitric acid) with aqueous $H_2SO_4$ to produce aqueous $HNSO_5$ and $HNO_3$ by reaction (2) and aqueous $HNSO_5$ by the reverse or reaction (3) and returning the resulting solution to step (a) or step (d) of the process, whereby substantially all of the nitrogen values are recovered and ultimately converted into nitric acid product.

The $HNO_3$ recovered in step (c) of the process can be further treated, if desired. For example, where $HNO_3$ is recovered by cooling and partial condensing or by contact with water or dilute nitric acid, or by a combination of these, the nitric acid produced will be a liquid and will contain small amounts of dissolved nitrogen oxides which will impart to the acid a brownish color. In such case, the liquid $HNO_3$ can be contacted with a stream of air or other stripping gas to remove the dissolved nitrogen oxides and produce a bleached nitric acid product.

For a better understanding of the invention, reference is made to FIGURE 1 of the drawings and the following description of a specific example of a preferred embodiment of the invention as illustrated in FIGURE 1. Ammonia in line 10 is combined with compressed air from line 11, this air being compressed to a pressure of about 30 p.s.i.a. in primary air compressor 12. The ammonia and air are contacted in the presence of a platinum-rhodium catalyst in an ammonia burner indicated generally at 13. The ammonia burner gas in line 14, at a temperature of about 1620° F., is cooled to about 386° F. in heat exchangers 16 and 17, then passed through a platinum filter 18 serving to filter catalyst carried over from ammonia burner 13. The filtered gas in line 19 is then cooled to about 104° F. by indirect heat exchange with cooling water in heat exchanger 21, thereby condensing a substantial portion of the water present in the ammonia burner gas. The partially condensed mixture in line 22 is separated in separating drum 23 with liquid water being withdrawn therefrom through line 24 and dried burner gas through line 26. The withdrawn water in line 24 contains little or no $HNO_3$ since, at the pressure involved and with the residence time afforded by the equipment upstream from heat exchanger 21, little or no NO will have reacted to $NO_2$.

The dried burner gas in line 26 at a pressure of about 18 p.s.i.a., is passed to oxidizer 27 wherein NO is permitted to react with free oxygen present in the burner gas to form $NO_2$. Oxidizer 27 is so sized that approximately half of the NO is oxidized to $NO_2$, whereby the oxidized gas in line 28 from oxidizer 27 is substantially equimolar in NO and $NO_2$.

The gas in line 28 at a temperature of about 290° F. is then contacted in $N_2O_3$ absorber 29 with aqueous $H_2SO_4$ of 86% strength introduced through line 31 at a temperature of 104° F. The NO and $NO_2$ are absorbed by the sulfuric acid in accordance with the reverse of reaction (3), thereby leaving a tail gas at a temperature of about 104° F. in line 32 containing substantially all of the free nitrogen and unreacted oxygen remaining in the burner gas. Since the gas fed to absorber 29 is equimolar in NO and $NO_2$, very nearly all of these nitrogen values are recovered into the sulfuric acid with only minor losses of nitrogen values in the tail gas in line 32. Absorber 29 is divided into two sections, as shown, to facilitate the removal of heat of absorption. Liquid from the top bed at a temperature of about 212° F. is removed through line 33, cooled by indirect heat exchange with cooling water in heat exchanger 34, and returned to absorber 29 through line 36 at a temperature of about 104° F. Absorber 29 is operated at a pressure of about 17 p.s.i.a., this being the pressure of the ammonia burner gas in line 14 reduced by the pressure drops incurred in the course of the passage of the burner gas through the equipment upstream from absorber 29.

The bottoms stream from absorber 29 in line 37 at a temperature of about 230° F. is passed by pump 38 through line 39 to reaction tower 41 which is divided into four sections 42, 43, 44 and 46. The $HNSO_5$ solution introduced to tower 41 through line 39 joins the liquid descending from section 43, the combined streams passing downwardly through sections 44 and 46 wherein the $HNSO_5$ is regenerated to liberate NO ond $NO_2$ in the gas phase. This regeneration is accomplished in part by the introduction of steam immediately below section 44 through line 47 and by the introduction of hot air through line 48 immediately below section 46. The hot air in line 48 is obtained by compressing air in secondary air compressor 49 to a pressure of about 39 p.s.i.a., passing the compressed air through line 51 to heat exchanger 16 wherein heat is recovered from the ammonia burner gas sufficient to raise the temperature of the air in line 48 to about 1000° F. The heating, diluting with steam condensate and stripping which occur in sections 44 and 46 of tower 41 combine to remove nitrogen values from the liquid, producing a gas which is increasingly enriched in nitrogen oxides as it ascends through sections 46 and 44 of the tower. The presence of air serves as well to provide oxygen by which a substantial portion of the NO liberated is oxidized to $NO_2$, thereby further enriching the gas emanating from the top of section 44 in $NO_2$.

The gas containing $NO_2$ from section 44 of towar 41 is contacted in sections 43 and 42 of the tower with aqueous sulfuric acid, containing 86% $H_2SO_4$, introduced at a temperature of about 137° F. through line 52. $HNO_3$ is formed in sections 43 and 42 in accordance with reaction (2) and is stripped in part from the liquid phase such that the overhead gas in line 53 contains a substantial proportion of $HNO_3$. The $HNSO_5$ solution formed in sections 42 and 43 descends, as previously indicated, to join the fresh $HNSO_5$ solution from line 39 for regeneration in sections 44 and 46 of tower 41.

The overhead gas from tower 41 in line 53, at a temperature of about 240° F. and a pressure of about 30 p.s.i.a., is cooled by indirect heat exchange with cooling water in heat exchanger 54 to a temperature of about 104° F. whereby a substantial portion of the $HNO_3$ present is condensed. The cooled and partially condensed gas in line 56 is passed to liquid-vapor separator 57 from which vapor and liquid streams are withdrawn through lines 58 and 59, respectively. The vapor streams in line 58 passes to $HNO_3$ absorber 61, having two sections 62 and 63, wherein it is contacted in section 63 with the liquid introduced through line 59 and is contacted in section 62 with water introduced through line 66. The resulting liquid product acid is withdrawn from the bottom of $HNO_3$ absorber 61 to a temperature of about 201° F. and a pressure of about 27 p.s.i.a. through line 67. This acid is cooled by indirect heat exchange with cooling water in heat exchanger 68 to a temperature of about 104° F., then passed by pump 69 through line 71 to bleacher 72. A portion of the compressed air from secondary air compressor 49 is diverted through line 73 to bleacher 72 to strip dissolved nitrogen oxides and bleach the product nitric acid. The overhead gas from bleacher 72 in line 74 at a temperature of 200° F. rejoins the compressed secondary air in line 51, as a result of which the nitrogen values stripped in the course of bleaching are returned to and recovered in the process. The bleached product nitric acid is withdrawn from the bottom of bleacher 72 through line 76 at a temperature of about 111° F. and a pressure of about 39 p.s.i.a. as the product of the process.

Returning to $HNO_3$ absorber 61, an overhead gas stream is obtained in line 77 containing $NO_2$, $N_2O_4$ and other constituents introduced into absorber 61 but not absorbed. In order to recover the nitrogen values in the overhead gas in line 77, it is passed to $NO_2$ absorber 78 wherein it is countercurrently contacted with 86% $H_2SO_4$ at a temperature of 104° F. introduced through line 79. The overhead gas stream from absorber 78 is vented through line 81 at a temperature of about 104° F. Since substantially all of the nitrogen oxides are absorbed from the gas in absorber 78, the vent gas in line 81 contains substantially no nitrogen oxides. The $HNSO_5$–$HNO_3$ solution formed in $NO_2$ absorber 78 is withdrawn from the bottom thereof at a temperature of about 178° F. and a pressure of about 24 p.s.i.a. and is passed through line 82 to reaction tower 41 at a point between sections 42 and 43 thereof, whereby the $HNO_3$ present in the solution is stripped therefrom, the $HNSO_5$ present in the solution is regenerated, and substantially all of the nitrogen values are recovered and ultimately delivered as $HNO_3$ product of the process.

Turning now to the bottom liquids stream from reaction tower 41, this stream is recovered from tower 41 at a temperature of about 331° F. and a pressure of about 36 p.s.i.a. and passed through line 83 to the top of water stripper 84 wherein it is countercurrently contacted with compressed air preheated to a temperature of about 1000° F. introduced through line 86. This compressed air is obtained by compressing air to a pressure of about 21 p.s.i.a. in stripper air compressor 87 and preheating the resulting compressed air to a temperature of above 1000° F. by passing the compressed air through line 88 to heat exchanger 17 and thus recovering heat from the ammonia burner gas. Water stripped in stripper 84 is vented therefrom at a temperature of about 350° F. and a pressure of about 15 p.s.i.a. through line 89.

Reconcentrated sulfuric acid at a temperature of about 306° F. is recovered from the bottom of stripper 84 and passed through line 91 to heat exchanger 92 wherein it is cooled to a temperature of about 137° F. by indirect heat exchange with cooling water. The cooled sulfuric acid in line 93 is divided into two streams in lines 94 and 96. The portion in line 94 is passed by pump 97 through line 98 to heat exchanger 99 wherein it is further cooled to a temperature of about 104° F. by indirect heat exchange with cooling water and furnished through line 31 to $N_2O_3$ absorber 29 as aforesaid. The sulfuric acid in line 96 is passed by pump 101 through line 102, a portion is diverted through line 52 to the top of reaction tower 41 as aforesaid and the other portion is diverted through line 103 to heat exchanger 104 wherein it is further cooled to a temperature of about 104° F. by indirect heat exchange with cooling water from which it is passed by line 79 to $NO_2$ absorber 78 as aforesaid.

As a specific example of the particular process described in connection with FIGURE 1, reference is made to Table I hereof wherein flow rates and stream compositions of the major process streams involved are set forth based upon producing 95% $HNO_3$ product in line 76 at a rate of about 25,740 pounds per hour, corresponding to 293 tons of 100% nitric acid per stream day. Ammonia flow in line 10 is 403 mols per hour (m.p.h.). Air flows in lines 11, 51, 73 and 88 are 356 m.p.h., 1228 m.p.h., 330 m.p.h., and 5900 m.ph., respectively. Steam and water flows in lines 47 and 66 are 1405 m.p.h. and 51.6 m.p.h., respectively.

the preceding detailed specific example are, however, merely illustrative and are not to be understood as limiting.

TABLE I

| Line Number | 14 | 19 | 26 | 28 | 32 | 39 | 53 | 58 | 59 | 76 | 77 | 81 | 82 | 83 | 91 |
|---|---|---|---|---|---|---|---|---|---|---|---|---|---|---|---|
| Liquid composition, lb./hr | | | | | | 158,600 | | | 18,190 | 25,740 | | | 128,500 | 415,150 | 390,000 |
| $HNO_3$, wt. percent | | | | | | | | | 98.2 | 95.0 | | | * 2.6 | | |
| $H_2SO_4$, wt. percent | | | | | | | 75 | | | | | | 83.4 | 80.7 | 86.0 |
| $HNSO_5$, M/L | | | | | | | 3.8 | | | | | | 2.6 | | |
| Gas composition, lb.-mols/hr.: | | | | | | | | | | | | | | | |
| $HNO_3$ | | | | | | | | 388 | 104 | | | | | | |
| NO | 392 | 388 | 388 | 196 | 0.5 | | | | | | | | | | |
| $NO_2$ | | 4 | 4 | 196 | 0.5 | | 400 | 180 | | | 172 | 1 | | | |
| $N_2O_4$ | | | | | | | | 110 | | | 114 | | | | |
| $H_2O$ | 702 | 702 | 204 | 204 | 0.5 | | 20 | 1 | | | | | | | |
| $O_2$ | 199 | 197 | 197 | 101 | 101 | | 55 | 55 | | | 55 | 55 | | | |
| $N_2$ | 2,740 | 2,740 | 2,740 | 2,740 | 2,740 | | 945 | 945 | | | 945 | 945 | | | |
| Total | 4,033 | 4,031 | 3,533 | 3,437 | 2,842 | | 1,808 | 1,395 | | | 1,286 | 1,001 | | | |

* M/L

It will be noted in connection with the preceding specific example that high-strength nitric acid is produced simply and directly without dependence upon carrying the relatively slow NO oxidation to $NO_2$ to substantial completion or upon dehydrating with $H_2SO_4$ and distillation, that the process is well adapted to the production of nitric acid by recovery of nitrogen oxides generated by the oxidation of ammonia at low pressures, whereby the several enumerated advantages of low-pressure ammonia oxidation can be realized, and that the process is usually capable of reducing losses of nitrogen oxides to very low levels by taking appropriate advantage of the solubility of these oxides in sulfuric acid. Those skilled in the art will readily see from the foregoing that the process is not limited to producing any particular strength of nitric acid, but that it can be applied to the production of nitric acid of 58% or lower strength to 98% or higher.

It will be understood that various valves and relates instrumentation are required in operating the process specifically described. Since the need for such equipment and its manner of use will be readily apparent to those skilled in the art from the foregoing, these items have been omitted from the drawing and this description in the interest of clarity and simplicity.

To illustrate further the wide variety of conditions that can be used in connection with step (a) of the process (or, in the case of FIGURE 1, the preferred embodiment of step (a) carried out in sections 42 and 43 of reaction tower 41), a number of sets of suitable process conditions are set forth in Table II hereof.

TABLE II

| Case | A | B | C | D | E | F | G | H |
|---|---|---|---|---|---|---|---|---|
| Outlet gas: | | | | | | | | |
| $H_2O$ part. press., atm | 0.05 | 0.018 | 0.018 | 0.018 | 0.17 | 0.17 | 0.17 | 0.05 |
| $HNO_3$, percent of total combined nitrogen | (*) | 10.4 | 9.8 | 37 | 9.8 | 18 | 35 | 9.8 |
| Temperature, °F | 150 | 150 | 150 | 210 | 250 | 350 | 350 | 250 |
| Inlet gas: $NO_2$ part. press., atm | 1.46 | 0.74 | 1.46 | 0.74 | 1.46 | 0.86 | 0.50 | 1.46 |
| Inlet liquid: $H_2SO_4$, wt. percent | 63 | 72.7 | 76 | 82 | 78.5 | 89 | 87 | 74.5 |
| Outlet liquid: $HNSO_5$, M/L | | 1.6 | 3.4 | 2.0 | 1.6 | 5.0 | 0.8 | 2.0 |
| $HNO_3$ product, wt. percent | (*) | 93 | 96 | 97 | 73 | 73 | 73 | 90 |

* Substantially none.

Referring to Table II and particularly to Case A thereof, it will be noted that substantially no $HNO_3$ is reported in the outlet gas with the result that substantially no $HNO_3$ product is made. This illustrates the importance of employing a minimum sulfuric acid strength of at least about 67 weight percent in the process. In Case A, $H_2SO_4$ strength is only 63%. $H_2SO_4$ strengths above 67% are used in Cases B–H and notwithstanding use in Cases B–H of conditions otherwise no more favorable to the production of $HNO_3$ than in Case A, substantial $HNO_3$ content in the outlet gas is noted as is the production of high-strength nitric acid.

Cases B–H in Table II illustrate the wide variation in operating conditions that can be used with good results in practicing the process of the invention. These cases and Various modifications to the procecs will be apparent to those skilled in the art from the foregoing and may be used without departure from the spirit or scope of the invention which is defined in the appended claims.

What is claimed is:

1. In a continuous process for the production of nitric acid from gases containing nitrogen oxides wherein the gases are converted to nitrosyl sulfuric acid and nitric acid and wherein sulfuric acid is recovered from the nitrosyl sulfuric acid, the improvements which comprise:
   (1) passing the nitrosyl sulfuric acid in countercurrent relation with steam and air to liberate nitrogen dioxide and nitrogen oxide and recover sulfuric acid,
   (2) reacting the nitrogen oxide liberated with the oxygen in the air to produce a gas stream enriched in nitrogen dioxide,
   (3) passing, into a reaction section maintained at a temperature of from about 100° F. to about 400° F. without supply of external heat, the nitrogen dioxide enriched gas stream in countercurrent relation with a liquid stream containing water and at least about 67 weight percent sulfuric acid,
   (4) reacting, in said reaction section, the nitrogen dioxide in the enriched gas with the sulfuric acid in the countercurrently flowing liquid stream to produce nitric acid and nitrosyl sulfuric acid, said nitric acid being distributed between the liquid and gas phases present in the reaction section and nitrosyl sulfuric acid being maintained in the liquid phase,
   (5) withdrawing from said reaction section said gas phase comprising nitric acid and recovering nitric acid therefrom,
   (6) withdrawing from said reaction section said liquid phase containing nitrosyl sulfuric acid, and therewith providing at least a part of the nitrosyl sulfuric acid required for step (1) of the process.

2. A process as defined in claim 1 in which fresh nitrogen values are fed to the process by admixing with the nitrogen dioxide enriched gas stream a gas stream containing nitrogen dioxide and obtained by the oxidation of ammonia combustion gas.

3. A process as defined in claim 1 in which fresh nitrogen values are fed to the process by admixing an aqueous liquid solution of nitrosyl sulfuric acid with the liquid phase withdrawn from the reaction section thereby providing the nitrosyl sulfuric acid required for step (1) of the process.

4. A process as defined in claim 1 in which the gas phase removed from the reaction section in step (5) of the process contains nitric acid in an amount of at least 10 mol percent of the total combined nitrogen of said gas phase.

5. In a continuous process for the production of nitric acid from gases containing nitrogen oxides wherein the gases are converted to nitrosyl sulfuric acid and nitric acid and wherein sulfuric acid is recovered from the nitrosyl sulfuric acid, the improvements which comprise:

(1) passing the nitrosyl sulfuric acid in countercurrent relation with steam and air to liberate nitrogen dioxide and nitrogen oxide and recover sulfuric acid, (2) reacting the nitrogen oxide liberated with the oxygen in the air to produce a gas stream enriched in nitrogen dioxide, (3) passing, into a reaction section maintained at a temperature of from about 100° F. to about 400° F. without supply of external heat, the nitrogen dioxide enriched gas stream in countercurrent relation with a liquid stream containing water and at least about 67 weight percent sulfuric acid, (4) reacting, in said reaction section, the nitrogen dioxide in the enriched gas with the sulfuric acid in the countercurrently flowing liquid stream to produce nitric acid and nitrosyl sulfuric acid, said nitric acid being distributed between the liquid and gas phases present in the reaction section and said nitrosyl sulfuric acid being maintained in the liquid phase, (5) withdrawing from said reaction section said gas phase containing nitric acid in an amount of at least 10 mol percent of the total combined nitrogen of said gas phase, (6) withdrawing from said reaction section said liquid phase containing nitrosyl sulfuric acid, and therewith providing at least a part of the nitrosyl sulfuric acid required for step (1) of the process, (7) providing the remaining nitrosyl sulfuric acid required for step (1) of the process by contacting a gas stream containing nitrogen dioxide and nitrogen oxide and obtained from the oxidation of ammonia combustion gas with sulfuric acid to absorb substantially all nitrogen oxides from the gas to produce a liquid stream containing nitrosyl sulfuric acid.

References Cited

UNITED STATES PATENTS

| | | | |
|---|---|---|---|
| 1,197,295 | 8/1916 | Jensen | 23—160 |
| 1,120,436 | 12/1914 | Bergfeld | 23—157 |
| 1,291,909 | 1/1919 | Jensen | 23—160 |
| 1,772,302 | 8/1930 | Battegay | 23—162 |
| 2,960,386 | 11/1960 | Berl | 23—161 |

FOREIGN PATENTS

| | | |
|---|---|---|
| 498,898 | 1/1939 | Great Britain. |
| 535,306 | 1/1957 | Canada. |
| 647,594 | 12/1950 | Great Britain. |

OSCAR R. VERTIZ, Primary Examiner

G. O. PETERS, Assistant Examiner

U.S. Cl. X.R.

23—203

PO-1050
(5/69)

UNITED STATES PATENT OFFICE
CERTIFICATE OF CORRECTION

Patent No. 3,506,396            Dated April 14, 1970

Inventor(s) Christiaan P. van Dijk and Robert Kaiser

It is certified that error appears in the above-identified patent and that said Letters Patent are hereby corrected as shown below:

Column 1, line 20, for "received" read --recovered--; line 27, for "produced" read --produce--. Column 3, line 22, for "esesntial" read --essential--. Column 7, line 71, for "to" read --at--.

SIGNED AND
SEALED
NOV 3 1970

(SEAL)
Attest:

Edward M. Fletcher, Jr.
Attesting Officer

WILLIAM E. SCHUYLER, JR.
Commissioner of Patents